United States Patent [19]
Yamaoka

[11] Patent Number: 5,925,997
[45] Date of Patent: Jul. 20, 1999

[54] DRIVE CIRCUIT SYSTEM FOR POWER WINDOW

[75] Inventor: Koji Yamaoka, Saitama, Japan

[73] Assignee: Honda Giken Kogyo Kabushiki Kaisha, Tokyo, Japan

[21] Appl. No.: 09/118,923

[22] Filed: Jul. 20, 1998

[30] Foreign Application Priority Data

Jul. 22, 1997 [JP] Japan .................................... 9-195450

[51] Int. Cl.$^6$ ............................... E05F 15/20; B06J 1/00
[52] U.S. Cl. ........................ 318/483; 318/283; 318/444; 318/DIG. 2
[58] Field of Search .................................. 318/280–293, 318/480–483, 440–466, DIG. 2; 340/540, 601, 602; 15/250.001

[56] References Cited

U.S. PATENT DOCUMENTS

| | | | |
|---|---|---|---|
| 5,057,754 | 10/1991 | Bell | 318/483 |
| 5,293,105 | 3/1994 | West, Jr. | 318/483 |
| 5,300,395 | 4/1994 | Hotta et al. | 454/75 |
| 5,416,702 | 5/1995 | Kitagawa et al. | 364/424.05 |
| 5,459,380 | 10/1995 | Augustinowicz | 318/483 |

*Primary Examiner*—Paul Ip
*Attorney, Agent, or Firm*—Nikaido Marmelstein Murray & Oram LLP

[57] ABSTRACT

A drive circuit system includes an opening control circuit Eo adapted to close an opening relay to drive a motor in a window opening direction by operation of a control switch to an opening position, and a closing control circuit Es adapted to close a closing relay to drive the motor in a window closing direction by operation of the control switch to a closing position. The opening control circuit Eo and the closing control circuit Es include final output stage transistors To and Ts, respectively, each of which comprises a PNP-type transistor. When the drive circuit system becomes wet due to the entry or condensation of water or liquid, a leak current I is permitted to flow simultaneously between bases of the final output stage transistors To and Ts and ground 2. Both of the transistors To and Ts are simultaneously turned on to close the opening relay and the closing relay. As a result, opposite ends of a motor are brought into high-potential states, so that the motor cannot be driven, thereby preventing the unintended opening and closing of the power window.

7 Claims, 5 Drawing Sheets

ENTERING OF WATER

ENTERING OF WATER

1

DRIVE CIRCUIT SYSTEM FOR POWER WINDOW

BACKGROUND OF THE INVENTION

1. Field of the Invention

The present invention relates to a drive circuit system for driving a motor for opening and closing a power window.

2. Description of the Related Art

A control switch for opening and closing a power window on the side of a driver's seat in an automobile is capable of selecting any of 1) a neutral position, 2) an opening position, 3) an automatic opening position, 4) a closing position and 5) an automatic closing position. If the control switch is moved to the opening position or the closing position, the motor is driven only for a period of time that the position is maintained, thereby opening or closing the power window. When the control switch is initially moved to the automatic opening position or the automatic closing position, the driving of the motor is automatically continued until the power window is fully opened or closed, even if the control switch is thereafter returned to the neutral position.

First, a prior art drive circuit system for a power window will be described below with reference to FIG. 1. A control switch S operated by a driver, an opening relay Ro adapted to be closed when the power window is opened and a closing relay Rs adapted to be closed when the power window is closed, are connected between a) a first line $L_1$, connected to a power source 1, comprising a battery of 12 volts mounted on a vehicle, and b) a second line $L_2$ connected to a ground of 0 volts. The control switch S includes a contact 3 biased toward a neutral position by a spring which is not shown. The contact 3 is capable of being connected to an opening terminal 4o, a closing terminal 4s, an automatically opening terminal 4ao and an automatically closing terminal 4as when moved by an operator.

An electronic circuit E detects five operated positions of the control switch S and controls the opening and closing of the opening relay Ro and the closing relay Rs depending upon the position of the contact 3. When the control switch S is moved to the opening position to connect the contact 3 to the opening terminal 4o, a coil 5o of the opening relay Ro is energized, whereby a contact 6o is separated from an OFF terminal 7o and connected to an ON terminal 8o. As a result, a circuit is formed and consists of the power source 1, the first line $L_1$, the ON terminal 8o of the opening relay Ro, the contact 6o, a third line $L_3$, the motor 9, the third line $L_3$, the contact $6_s$ of the closing relay Rs and the OFF terminal 7s, the second line $L_2$ and ground 2. Thus, the motor 9 is driven in an opening direction to open the power window.

When the control switch S is moved to the closing position to connect the contact 3 to the closing terminal 4s, the coil 5s of the closing relay Rs is energized, whereby the contact 6s is separated from the OFF terminal 7s and connected to the ON terminal 8s. As a result, a circuit is formed and consists of the power source 1, the first line $L_1$, the ON terminal 8s of the closing relay Rs and the contact 6s, the third line $L_3$, the motor 9, the third line $L_3$, the contact 6o of the opening relay Ro and the OFF terminal 7o, the second line $L_2$ and ground 2. Thus, the motor 9 is driven in a closing direction to close the power window.

When the control switch S is moved to the automatically opening position or automatically the closing position to connect the contact 3 to the automatically opening terminal 4ao or the automatically closing terminal 4as, the electronic circuit E energizes the coil 5o of the opening relay Ro or the coil 5s of the closing relay Rs to drive the motor 9 in the opening or closing direction. When the motor 9 is initially driven, the driving of the motor 9 is continued by the electronic circuit E, even if the control switch S is returned to the neutral position. The electronic circuit E, which receives a signal from the rotative pulser 11 which is mechanical connected to a rotary shaft of the motor 9, deenergizes the coil 5o of the opening relay Ro or the coil 5s of the closing relay Rs to stop driving the motor 9, when the electronic circuit E detects that the power window has reached the fully opened or closed position.

If an object is caught between a window frame and a window pane during driving of the power window in the closing direction, the load of the motor 9 is increased. The electronic circuit E detects that an object is caught from an electric current of the motor 9. As a result, the electronic circuit E opens the closing relay Rs and closes the opening relay for a predetermined period of time, thereby driving the power window slightly in the opening direction to prevent the object from being caught.

In the above prior art drive circuit system, if the opening relay Ro is closed by energization of the coil 5o of the opening relay Ro due to a current leakage when the electronic circuit E becomes wet due to water entering the circuit E or due to water condensation, there is a possibility that the power window is inadvertently opened. Reversely, if the closing relay Rs is closed by energization of the coil 5s of the closing relay Rs due to a current leakage, there is a possibility that the power window is inadvertently closed.

SUMMARY OF THE INVENTION

Accordingly, it is an object of the present invention to ensures that when an abnormality is generated in the drive circuit system for the power window due to a liquid such as water entering the system, the unintended opening or closing of the power window is prevented.

To achieve the above object, according to a first aspect and feature of the present invention, there is provided a drive circuit system for a power window for driving a motor for opening and closing the power window, comprising an opening relay for connecting the motor to a power source in order to drive the motor in a window opening direction. A closing relay connects the motor to the power source in order to drive the motor in a window closing direction. A control switch is adapted to connect a coil of the opening relay to the power source by operation thereof in the window opening direction and to connect a coil of the closing relay to the power source by the operation thereof in the window closing direction. When the drive circuit system becomes wet, the opening relay and the closing relay are simultaneously closed by a current leakage.

With the above arrangement, when the drive circuit system for the power window becomes wet due to water or liquid entry or water condensation which generates a current leakage, the opening relay and the closing relay are simultaneously closed. Therefore, the motor cannot be rotated and thus the unintended opening and closing of the power window is prevented.

According to a second aspect and feature of the present invention, in addition to the arrangement of the first feature, the drive circuit system further includes a) an opening control circuit adapted to connect the coil of the opening relay to the power source based on a signal from the control switch, and b) a closing control circuit adapted to connect the coil of the closing relay to the power source based on a signal from the control switch. Each of the control circuits have a final output stage transistor which comprises a PNP-type transistor.

With the above arrangement, the final output stage transistor of each of the opening control circuit and the closing control circuit comprises the PNP-type transistor which is easily turned on by a current leakage (i.e., leak current) between the transistor and ground. Therefore, upon the occurrence of the drive circuit system becoming wet due to the entry or condensation of a liquid, both of the relays can be simultaneously closed to prevent the unintended opening and closing of the power window.

According to a third aspect and feature of the present invention, in addition to the arrangement of the second feature, each of the final output stage transistors are disposed with its base facing ground through a gap for permitting the leak current to flow.

With the above arrangement, upon the occurrence of the drive circuit system becoming wet due to the entry or condensation of a liquid, the final output stage transistor can be turned on by permitting the leak current to flow from the base of the final output stage transistor through the gap to ground, whereby both of the relays can be simultaneously closed to prevent the unintended opening and closing of the power window.

According to a fourth aspect and feature of the present invention, in addition to the arrangement of the second feature, the final output stage transistors of the opening and closing control circuits are disposed adjacent to each other.

With the above arrangement, the final output stage transistors of the opening control circuit and the closing control circuit simultaneously become wet and hence, both of the relays can be simultaneously closed to prevent the unintended opening and closing of the power window.

According to a fifth aspect and feature of the present invention, in addition to the arrangement of the first feature, the drive circuit system further includes a liquid-wetting detecting means for detecting the occurrence of drive circuit system becoming wet to simultaneously close the opening relay and the closing relay.

With the above arrangement, when the liquid-wetting detecting means detects the occurrence of the drive circuit system becoming wet, both of the relays are simultaneously closed. Therefore, it is possible to prevent the unintended opening and closing of the power window.

According to a sixth aspect and feature of the present invention, in addition to the arrangement of the fifth feature, the drive circuit system further includes a casing in which the following three components are accommodated: an opening control circuit adapted to connect the coil of the opening relay to the power source based on a signal from the control switch; a closing control circuit adapted to connect the coil of the closing relay to the power source based on a signal from the control switch; and the liquid-wetting detecting means. The liquid-wetting detecting means is disposed at a lowest location in the casing.

With the above arrangement, when a liquid enters the inside of the casing, the liquid-wetting detecting means, which is provided at the lowest location in the casing, becomes wet. Therefore, both of the relays can be simultaneously closed to prevent the unintended opening and closing of the power window.

According to an eighth aspect and feature of the present invention, in addition to the arrangement of the fifth feature, the drive circuit system further includes a casing in which the following three components are accommodated: an opening control circuit adapted to connect the coil of the opening relay to the power source based on a signal from the control switch; a closing control circuit adapted to connect the coil of the closing relay to the power source based on a signal from the control switch; and the liquid-wetting detecting means. The liquid-wetting detecting means is disposed to face an opening provided in the casing.

With the above arrangement, when a liquid enters the inside of the casing through the opening in the casing, the liquid-wetting detecting means, which faces the opening, first becomes wet with the liquid. Therefore, both of the relays can be simultaneously closed to prevent the unintended opening and closing of the power window.

The above and other objects, features and advantages of the invention will become apparent from the following description of the preferred embodiments taken in conjunction with the accompanying drawings.

BRIEF DESCRIPTION OF THE DRAWINGS

FIGS. 1 to 3 show a first embodiment of the present invention, wherein

FIG. 1 is a diagram of a drive circuit system for a power window;

FIG. 2 is a diagram of an electronic circuit;

FIG. 3 is a diagram showing final output stage transistors in their mounted states;

DETAILED DESCRIPTION OF THE PREFERRED EMBODIMENTS

The present invention will now be described by way of embodiments with reference to the accompanying drawings.

A drive circuit according to a first embodiment has a feature in the arrangement of an opening control circuit E$o$ and a closing control circuit E$s$ in an electronic circuit E. Each of the opening control circuit E$o$ and the closing control circuit E$s$ is comprised of multi-state transistor circuits which are turned on by the operation of a control switch S to energize a coil 5$o$ of an opening relay R$o$ or a coil 5$s$ of a closing relay R$s$. The final output state transistor circuit of the multi-stage transistor circuits is shown in FIG. 2.

Figure 1:
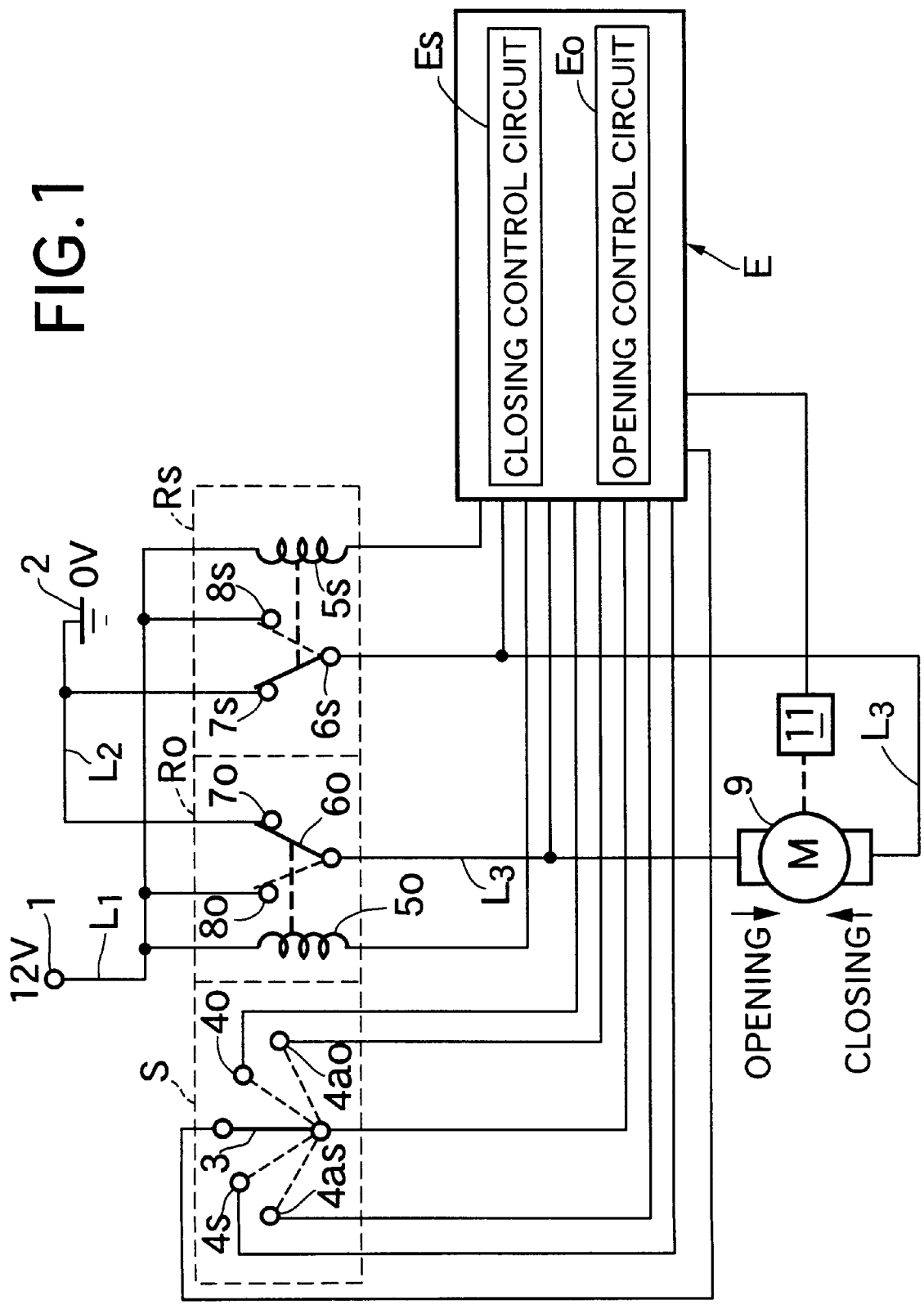
Figure 2:
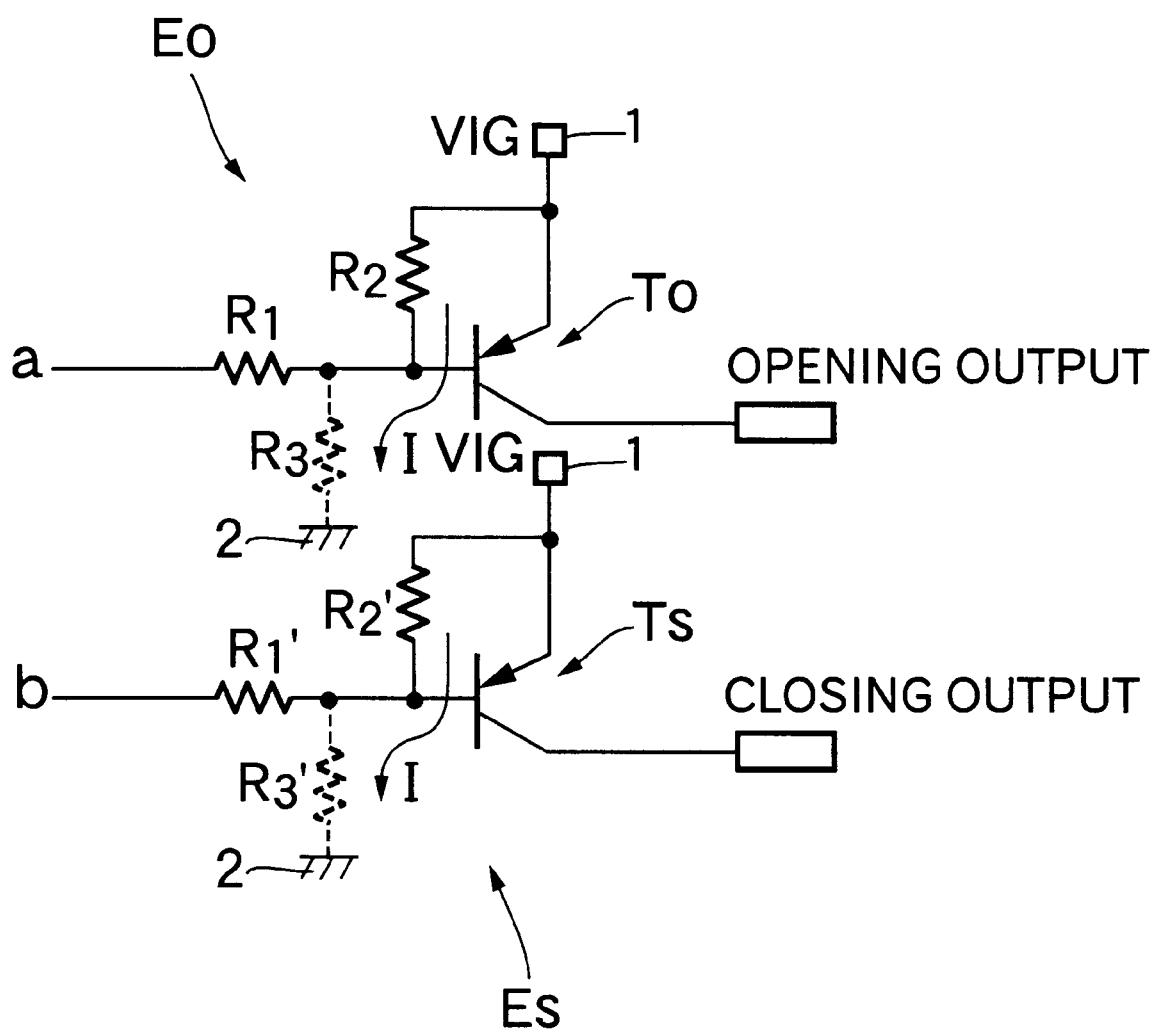

As can be seen from FIG. 2, the final output state transistor circuits of the opening control circuit E$o$ and the closing control circuit E$s$ are of the same construction, and include final output state transistors T$o$ and T$s$, respectively, each of which comprises a PNP-type transistor. If a terminal a is connected to ground 2 through the front stage transistor circuit (not shown) of the opening control circuit E$o$ by operating the control switch S to an opening position, a bias voltage provided by dividing a power source voltage VIG by two resistors R$_1$ and R$_2$ is applied to a base to turn on the final output state transistor T$o$. As a result, the coil 5$o$ is energized to close the opening relay R$o$, thereby driving a motor 9 in a window opening direction. If a terminal b is connected to ground 2 through the front state transistor circuit (not shown) of the closing control circuit E$s$ by operating the control switch S to a closing position, a bias voltage provided by dividing the power source voltage VIG by two resistors R$_1$' and R$_2$' is applied to a base to turn on the final output state transistor T$s$. As a result, the coil 5$s$ is energized to close the closing relay R$s$, thereby driving the motor 9 in a window closing direction.

Figure 3:
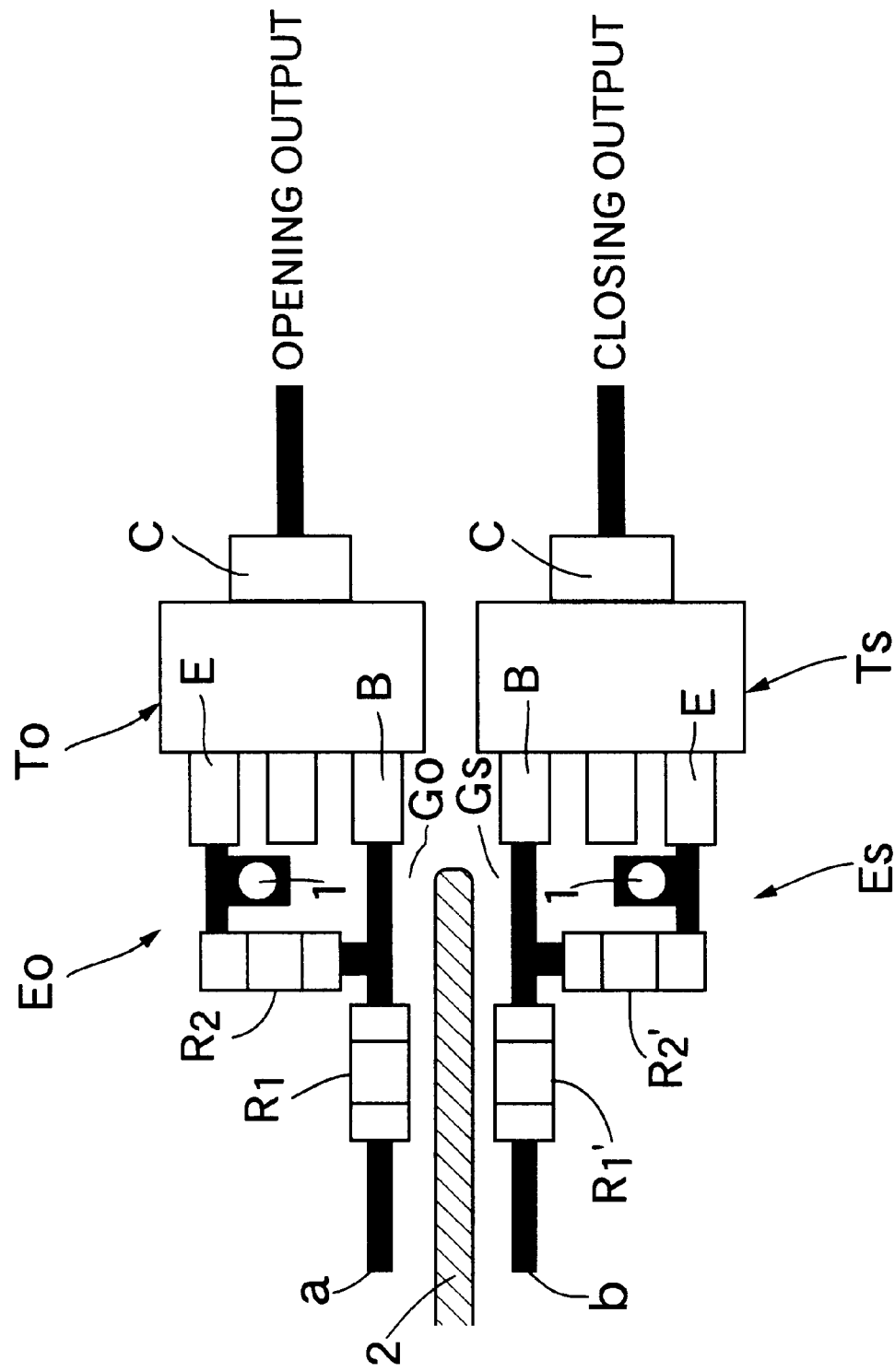

As can be seen from FIG. 3, the final output state transistor To of the opening control circuit Eo and the final output state transistor Ts of the closing control circuit Es are disposed adjacent to each other. Moreover, the bases of transistors To and Ts face ground 2 on a printed board through small and equal gaps Go and Gs, respectively.

If the electronic circuit becomes wet with water or other liquid due to the entry of water or other liquid or the condensation of water or other liquid, the insulation between the bases of the final output state transistors To and Ts, each comprising the PNP type transistor, and ground 2 is broken, thereby causing a leak current I to flow to ground through pseudo leak resistors $R_3$ and $R_3$' formed therein, as shown by a dashed line. As a result, both final output state transistors To and Ts are turned on to energize the coils 5o and 5s, thereby closing both the opening relay Ro and the closing relay Rs. When both the opening relay Ro and the closing relay Rs are closed in the above manner, opposite ends of the motor 9 are brought into high-potential states, so that the motor 9 cannot be driven, thereby preventing the misoperation of the power window such that the power window cannot be unintentionally opened or closed.

In this case, if the electronic circuit becomes wet, the opening relay Ro and the closing relay Rs are immediately and almost simultaneously closed to prevent the misoperation of the power window, since the final output stage transistors To and Ts are disposed adjacent to each other with their bases facing ground 2 on the printed board through the small and equal gaps Go and Gs, respectively.

A second embodiment of the present invention will now be described with reference to FIGS. 4 and 5.

Figure 4:
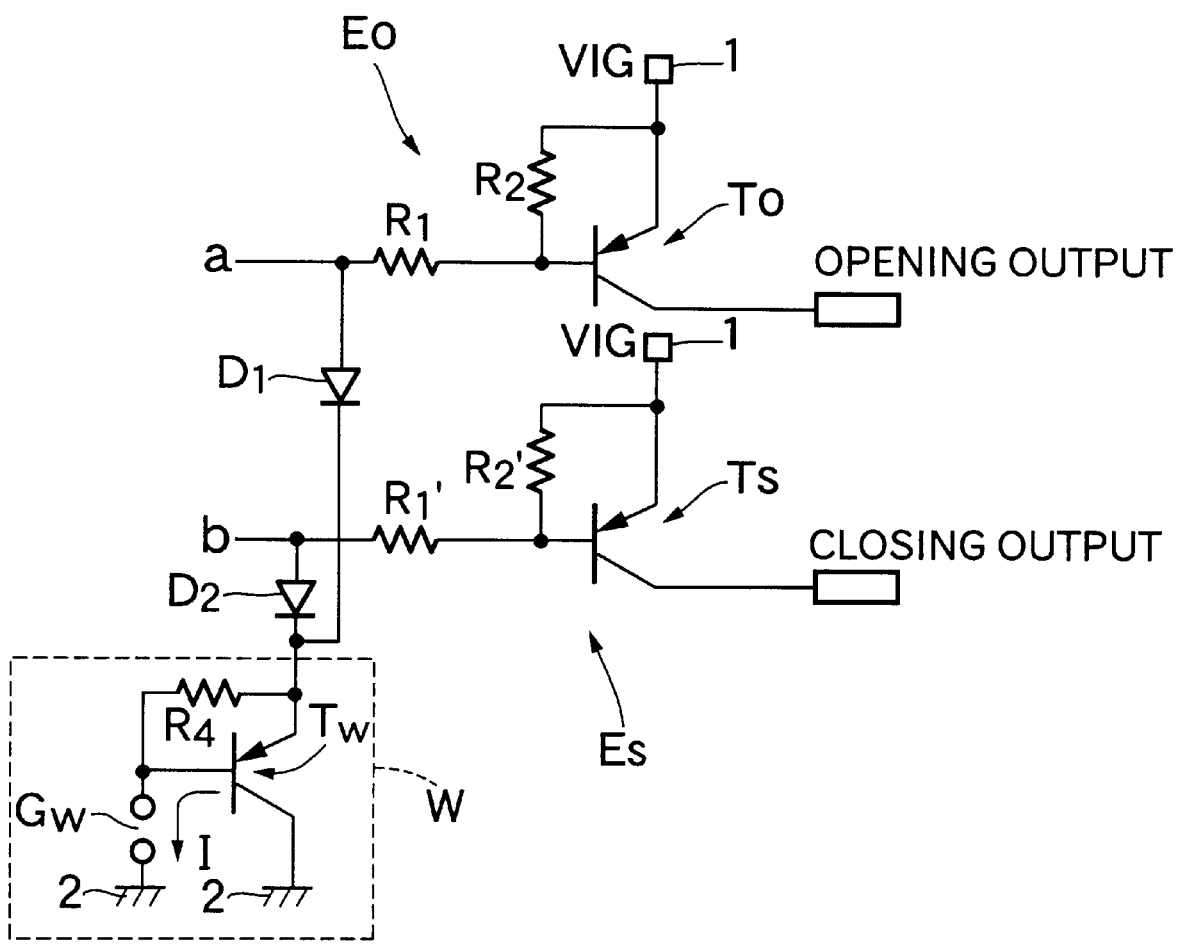
FIG. 4 is a diagram of an electronic circuit according to a second embodiment of the present invention.
Figure 5A:
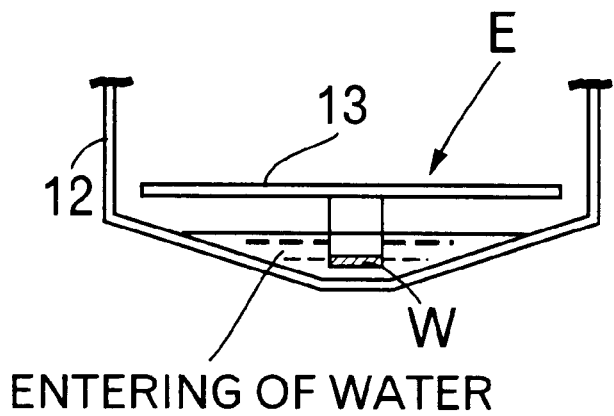
FIGS. 5A and 5B are diagrams showing the electronic circuit in its mounted state.
Figure 5B:
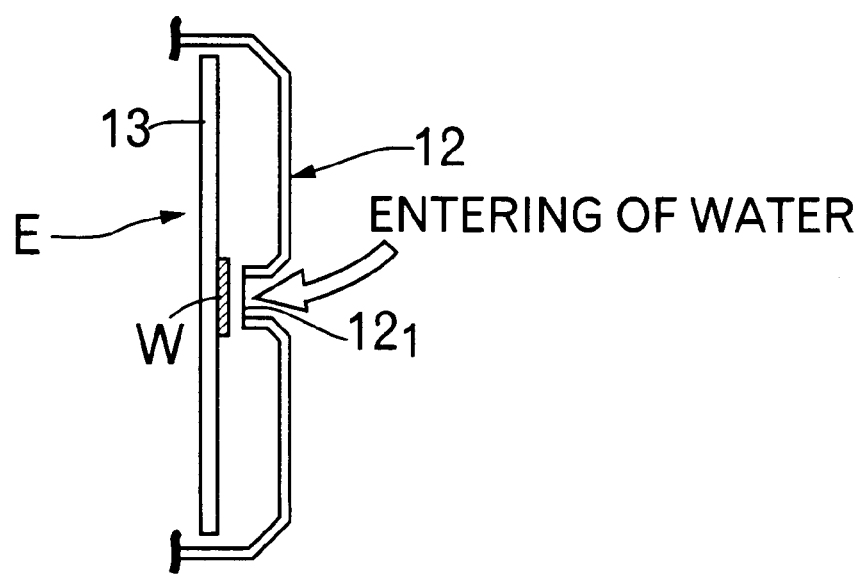

As apparent from the comparison of FIGS. 2 and 4 with each other, a liquid-wetting dectecting device means W is connected to final output stage transistor circuits in an opening control circuit Eo and a closing control circuit Es in the second embodiment shown in FIG. 4. The liquid-wetting detecting device W includes a PNP-type transistor Tw. An emitter of the transistor Tw has the terminals a and b of the opening control circuit Eo and the closing control circuit Es connected through diodes $D_1$ and $D_2$. A collector of the transistor Tw is connected to ground 2. A base of the transistor Tw is connected to ground through a small gap Gw. A resistor $R_4$ is connected between the emitter and base of the PNP-type transistor Tw. The liquid-wetting detecting means W having the above-described arrangement is disposed at a lowest location in a casing 12 in which a printed board 13 having an electronic circuit E is accommodated, as shown in FIG. 5A, or is disposed at a location at which the liquid-wetting detecting means faces an opening $12_1$, defined in a casing 12 in which a printed board 13 having an electronic circuit E is accommodated, as shown in FIG. 5B.

If water or other liquid enters the inside of the casing 12 having the electronic circuit E accommodated therein due to the entry of liquid or the condensation of water, the water-wetting detecting device W becomes, first of all, wet from the water or liquid, which causes a leak current I to flow through the gap Gw to turn the transistor Tw on. As a result, the final output stage transistors To and Ts of the opening control circuit Eo and the closing control circuit Es are simultaneously turned on to close the opening relay Ro and the closing relay Rs. Therefore, opposite ends of the motor 9 are brought into high-potential states, so that the motor 9 cannot be driven, thereby preventing the mis-operation of the power window such that the power window cannot be inadvertently opened or closed.

Although the embodiments of the present invention have been described in detail, it will be understood that the present invention is not limited to the above-described embodiments, and various modifications in design may be made without departing from the spirit and scope of the present invention defined in the claims.

What is claimed is:

1. A drive circuit system for a power window for driving a motor for opening and closing the power window, the drive circuit system comprising:

an opening relay for connecting said motor to a power source in order to drive said motor in a window opening direction;

a closing relay for connecting said motor to said power source in order to drive said motor in a window closing direction; and a control switch connects a coil of said opening relay to said power source by operation thereof in the window opening direction and to connect a coil of said closing relay to said power source by the operation thereof in the window closing direction, wherein when said drive circuit system becomes wet, said opening relay and said closing relay are simultaneously closed by a leak current.

2. A drive circuit system for a power window according to claim 1, further including an opening control circuit connects said coil of said opening relay to said power source based on a signal from said control switch, and a closing control circuit adapted to connect said coil of said closing relay to said power source based on a signal from said control switch, each of said opening and closing control circuits having a final output stage transistor which comprises a PNP-type transistor.

3. A drive circuit system for a power window according to claim 2, wherein each of said final output stage transistors is disposed with a base facing ground through a gap for permitting a leak current to flow.

4. A drive circuit system for a power window according to claim 2, wherein said final output stage transistors of said opening and closing control circuits are disposed adjacent to each other.

5. A drive circuit system for a power window according to claim 1, further including a liquid-wetting detecting means for detecting said drive circuit system becoming wet to simultaneously close said opening relay and said closing relay.

6. A drive circuit system for a power window according to claim 5, further including a casing in which a) an opening control circuit connects the coil of said opening relay to said power source based on a signal from said control switch; b) a closing control circuit adapted to connect the coil of said closing relay to said power source based on a signal from said control switch; and said liquid-wetting detecting means are accommodated, and said liquid-wetting detecting means is disposed at a lowest location in said casing.

7. A drive circuit system for a power window according to claim 5, further including a casing in which a) an opening control circuit connects the coil of said opening relay to said power source based on a signal from said control switch; b) a closing control circuit adapted to connect the coil of said closing relay to said power source based on a signal from said control switch; and c) said liquid-wetting detecting means are accommodated, said liquid-wetting detecting means is disposed to face an opening provided in said casing.

* * * * *